UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF MAKING DERIVATIVES OF XANTHIN.

SPECIFICATION forming part of Letters Patent No. 569,490, dated October 13, 1896.

Application filed May 18, 1896. Serial No. 592,049. (No specimens.)

*To all whom it may concern:*

Be it known that I, EMIL FISCHER, a citizen of Germany, residing at Berlin, Germany, have invented certain new and useful Improvements in the Art of Obtaining the Derivatives of Xanthin; and I do hereby declare the following to be a full, clear, and exact description of the invention, such as will enable others skilled in the art to which it appertains to make and use the same.

This invention relates to the art of obtaining derivatives (or homologues) of xanthin, and more particularly to the production of the trialkyl derivatives of xanthin; and it consists of forming such derivatives from alkyl derivatives of uric acid and such other methods, features, and steps as will be hereinafter described, and more particularly pointed out in the claims.

I have succeeded in obtaining from the alkyl derivatives of uric acid which contain two alkyl radicals in the alloxan group and which have the structural arrangement or formula

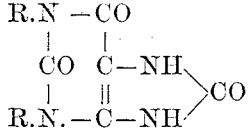

and by the aid of the pentachlorid or pentabromid of phosphorus, reacting upon such alkyl derivatives, halogen compounds which may easily be converted into homologues of xanthin by reduction. If, for instance, phosphorus pentachlorid is employed, reactions will take place under my treatment which are indicated in the following two equations:

1. $C_5H_2R_2N_4O_3 + PCl_5 = POCl_3 + HCl + C_5HR_2ClN_4O_2$.
2. $C_5HR_2ClN_4O_2 + H_2 = C_5H_2R_2N_4O_2 + HCl$.

When I employ dimethyl uric acid, the resulting reactions are expressed in the following structural equations:

and

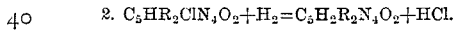

I have found that the above new compound, the chlorotheophyllin, may be converted into chlorocaffein, having the formula

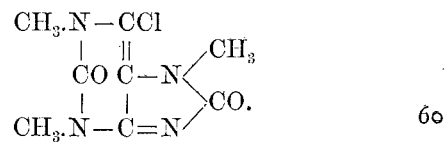

I am hence enabled by compounding reactions outlined above to proceed from dimethyl uric acid to caffein, and in a similar or generically identical manner to prepare other trialkyl derivatives of xanthin from alkyl derivatives of uric acid.

Example: For the preparation of caffein (trimethyl xanthin) I start with dimethyl uric acid containing both methyl radicals in the alloxan group and whose formula has been given above. This dimethyl uric acid is prepared according to the method invented by Dr. Ach and myself, and disclosed in *Sitzungsberichte der Akademie der Wissenschaften,* Berlin, 1895, page 171, said method consisting, essentially, in the action of dehydrating agents upon dimethyl pseudo uric acid. The dimethyl uric acid is finely powdered and heated to about 150° centigrade, together with double the quantity of phosphorus pentachlorid and four times its quantity of oxychlorid of phosphorus, in a closed vessel or tube, and retained at this temperature for about one hour, during which time the bulk of the dimethyl uric acid will enter into solution, the crystallization of the newly-formed resulting chlorotheophyllin beginning soon afterward. The reaction is completed after heating for from two to three hours. The crystalline mass which is formed is separated from the mother liquor after cooling and purified by recrystallizing from alcohol. This chlorotheophyllin melts at about 300° centigrade, the melting of the same being attended by decomposition. It is readily soluble in hot alcohol, somewhat more sparingly soluble in acetone, and soluble only with difficulty in chloroform. In a similar manner I obtain a mixture of chlorotheophyllin and bromotheophyllin if, in lieu of the phosphorus pentachlorid, I employ phosphorus pentabromid and again use phosphorus oxychlorid as the solvent.

To obtain chlorocaffein from chlorotheophyllin, I make use of the methylating methods.

For example, I may produce the silver salt of the chlorotheophyllin and heat the same with iodid of methyl. This silver salt of chlorotheophyllin may be obtained in the following manner: Chlorotheophyllin is dissolved in an aqueous solution of ammonia, and to this solution I add a solution of nitrate of silver in excess, and then a sufficient quantity of strong ammonia, until the resulting voluminous precipitate is redissolved. The ammonia is then driven off by heating, whereupon the silver salt precipitates out in the form of fine colorless needles. This silver salt of chlorotheophyllin, which crystallizes in fine needles and is almost insoluble in water, and which has the formula

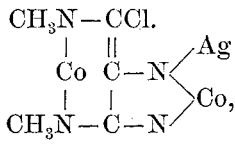

is heated to 100° centigrade with iodid of methyl, and maintained at this temperature for about twenty hours, whereupon an almost complete decomposition takes place, iodid of silver and chlorocaffein being currently formed. This reaction is expressed in the following equations:

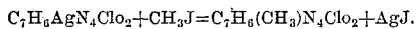

The chlorocaffein thus obtained is separated with the greatest facility from the iodid of silver by hot water or alcohol. Instead of the silver salt and the iodid of methyl, I may employ the lead salt and the chlorid or bromid of methyl by slightly modifying the process. The chlorocaffein so obtained may with the greatest ease be converted into caffein by nascent hydrogen or other reducing agents, as is already sufficiently known. In the same manner the mixture of chlorotheophyllin and bromotheophyllin and bromotheophyllin alone may be converted into the corresponding caffein derivatives and thence into caffein.

Analogous derivatives of xanthin of the type of caffein and other halogen derivatives may be obtained under my invention in the same manner from other dialkyl uric acid, such, e. g., as ethyl methyl uric acid or diethyl uric acid, containing the alkyl derivatives in the alloxan group. The products so obtained are to be employed in the same manner as caffein for therapeutic purposes or as food-stuffs.

The bromotheophyllin hereinbefore referred to may be made under the process set forth in my application, filed September 23, 1895, Serial No. 563,428, and which is as follows: One part finely-powdered theophyllin, which has been dried, is heated with five parts bromin to 100° centigrade, and maintained at that temperature for several hours in a tightly-closed vessel. The excess of bromin is thereupon removed and the contents of the vessel are heated to 150° centigrade, and maintained at that temperature until all free bromin has escaped. The residue is then comminuted and treated with aqueous sulphurous acid in excess and gently heated to completely decolorize the same. The crude bromotheophyllin is then completely purified by dissolving in lye and treating with animal charcoal. The product is then precipitated out of the lye-bath by acid, and the precipitate is then recrystallized from alcohol.

I do not herein claim the chlorotheophyllin or the process of obtaining the same, inasmuch as the same forms the subject-matter of my application, filed September 23, 1895, Serial No. 563,429, Patent No. 559,347, dated April 28, 1896, nor do I claim the bromotheophyllin or the process of obtaining the same, having made them the subject-matter of my application, filed September 23, 1895, Serial No. 563,428. Moreover, while I have herein described the method broadly of obtaining alkyl derivatives of xanthin and specifically of obtaining the dialkyl derivatives, I do not herein claim them, inasmuch as they are claimed in my application, filed September 23, 1895, Serial No. 563,430, but confine myself in this application to the art of obtaining the trialkyl derivatives of xanthin, their derivatives and homologues.

As will be seen from the above, the methods of carrying out my invention may be very considerably varied without departing from said invention, which, in a broad sense, resides in the treatment of dialkyl uric acid with the halogen compound of phosphorus in the presence of a solvent, the alkylizing of the resulting halogen derivatives of the homologue of xanthin to form halogen derivatives of a trialkyl derivative of xanthin, and, finally, in the reduction of such halogen derivatives to form the trialkyl derivative of xanthin.

The term "pentahalogen compound of phosphorus" employed in the claims is used to designate a compound containing in its molecule five atoms of the halogen element to one atom of phosphorus, such as $PCl_5$ or $PBr_5$.

What I claim, and desire to secure by Letters Patent, is—

1. The process which consists in treating the salt of a halogen dialkyl derivative of xanthin with an alkylizing agent, substantially as set forth.

2. The process which consists in heating the salt of a halogen dialkyl derivative of xanthin with a halogen compound of an alkyl, substantially as set forth.

3. The process which consists in heating the silver salt of chlorotheophyllin with iodid of methyl, substantially as set forth.

4. The process which consists in treating dialkyl uric acid with a halogen compound of phosphorus, then converting the resulting halogen dialkyl derivative of xanthin into its salt, and then alkylizing the said salt to form the halogen trialkyl derivative of xanthin.

5. The process which consists in treating dialkyl uric acid with a halogen compound of phosphorus, then converting the resulting halogen dialkyl derivative of xanthin into its salt, then alkylizing said salt, and finally reducing the halogen trialkyl derivative of xanthin, whereby the homologue of xanthin of the type of caffein is produced.

6. The process which consists in heating dialkyl uric acid with a pentahalogen compound of phosphorus in the presence of a solvent of the dialkyl uric acid, then converting the resulting halogen dialkyl derivative of xanthin into its salt, then treating such salt with the iodid of an alkyl, and finally treating the resulting halogen trialkyl derivative of xanthin with reducing agents, substantially as set forth.

7. The process which consists in heating dimethyl uric acid with a pentahalogen compound of phosphorus in the presence of phosphorus oxychlorid, then converting the resulting halogen derivative of theophyllin into its salt, and then treating such salt with methyl iodid, substantially as set forth.

8. The process which consists in heating dimethyl uric acid with a pentahalogen compound of phosphorus in the presence of a phosphorus oxychlorid, then converting the resulting halogen derivative of theophyllin into its salt, then treating such salt with methyl iodid, and finally treating the resulting chlorocaffein with a reducing agent, substantially as set forth.

In testimony whereof I affix my signature in presence of two witnesses.

EMIL FISCHER.

Witnesses:
W. HAUPT,
CHARLES H. DAY.